United States Patent Office 3,426,952
Patented Feb. 11, 1969

3,426,952
ARC WELDER HAVING BUILT-IN SHEAR FOR JOINING STRIP
Charles R. Chew, Hunting Valley, Ohio, and Endre Leslie Toth, Sharon, Pa., assignors to The Taylor-Winfield Corporation, Warren, Ohio
Filed Nov. 25, 1966, Ser. No. 597,100
U.S. Cl. 228—5
Int. Cl. B23k 1/20, 9/12
11 Claims

ABSTRACT OF THE DISCLOSURE

Apparatus for joining metal strip end to end, comprising a base mounting a pair of longitudinally spaced strip clamps through which strip flows when the clamps are open. A transverse shear and an adjacent transverse welder are longitudinally slidable, as an assembly, on the base between the strip clamps. The assembly is indexed by index means into an initial position between the clamps whereby the trailing end of one of the strip lengths, held in one clamp, is sheared. The assembly is indexed to a second position slightly spaced from the initial position so that the head end of the second strip length may be sheared. One of the clamps is along a line closely spaced from the first line of shear. The assembly is then indexed to a third position wherein the centerline of the welder is coincident with the center of the gap thus established between the strip length.

---

This invention relates to an improved machine for automatically trimming the ends of strip lengths to be joined and thereafter joining the strip lengths together by an arc, metallic arc gas shielded, tungsten inert gas, plasma, submerged arc, electron beam or other welding methods. Combined machines to perform these operations have been heretofore proposed, but the present invention seeks to provide a more simplified, more rugged, more compact, and more economical structure for performing this task whereby the equipment is better suited for continuous and heavy-duty service in a rough environment—in a steel mill, for example.

The primary object of the invention is to simplify yet improve the frame structure for equipment of the kind under discussion whereby the same is more rugged and durable as aforesaid but yet capable of economical construction, readily assemblable, and capable of vertical use in a mill environment. To this end, and in contrast with the prior art, the main strip clamps, both entry and exit, are ruggedly built as a rigidly and more or less permanently secured attachments to two spaced end housings of the frame structure and do not normally move longitudinally of the line of strip. In accord with the more or less known practice, the trimming or squaring shear, as well as the welding apparatus, is positioned between these clamps and is slidable longitudinally with respect to these clamps on a pair of spaced heavy rods, the end portions of which are staked into the end housings to thereby provide not only an improved carrier for the shear and welder but also an extremely rigid and easily assembled unitized frame for the whole assembly. This arrangement insures improved parallel or tapered register of the sheared ends of the strip lengths prior to welding, and such register is not disturbed by the transverse shifting of either clamp to align the two strip lengths longitudinally prior to welding.

A further object of the invention is to provide, in apparatus of the general kind outlined above, an improved yet simplified arrangement for supporting the main strip clamps on the housings of the frame structure for sliding transverse movement relative to the longitudinal line or axis of the strip when aligning the two strip lengths to be joined.

Another object of the invention is the provision, in combined apparatus of the general kind involved, of an improved arrangement for very simply but precisely and adjustably controlling the gap to be left between the adjacent sheared ends of the strip pieces prior to welding. The dimension and consistency of this gap is extremely important if high quality welds are to be consistently achieved in a rapid automatic manner.

The above and other objects and advantages of the invention will become more apparent upon consideration of the following specification and the accompanying drawings wherein there is disclosed a preferred embodiment of the invention.

Figure 1:
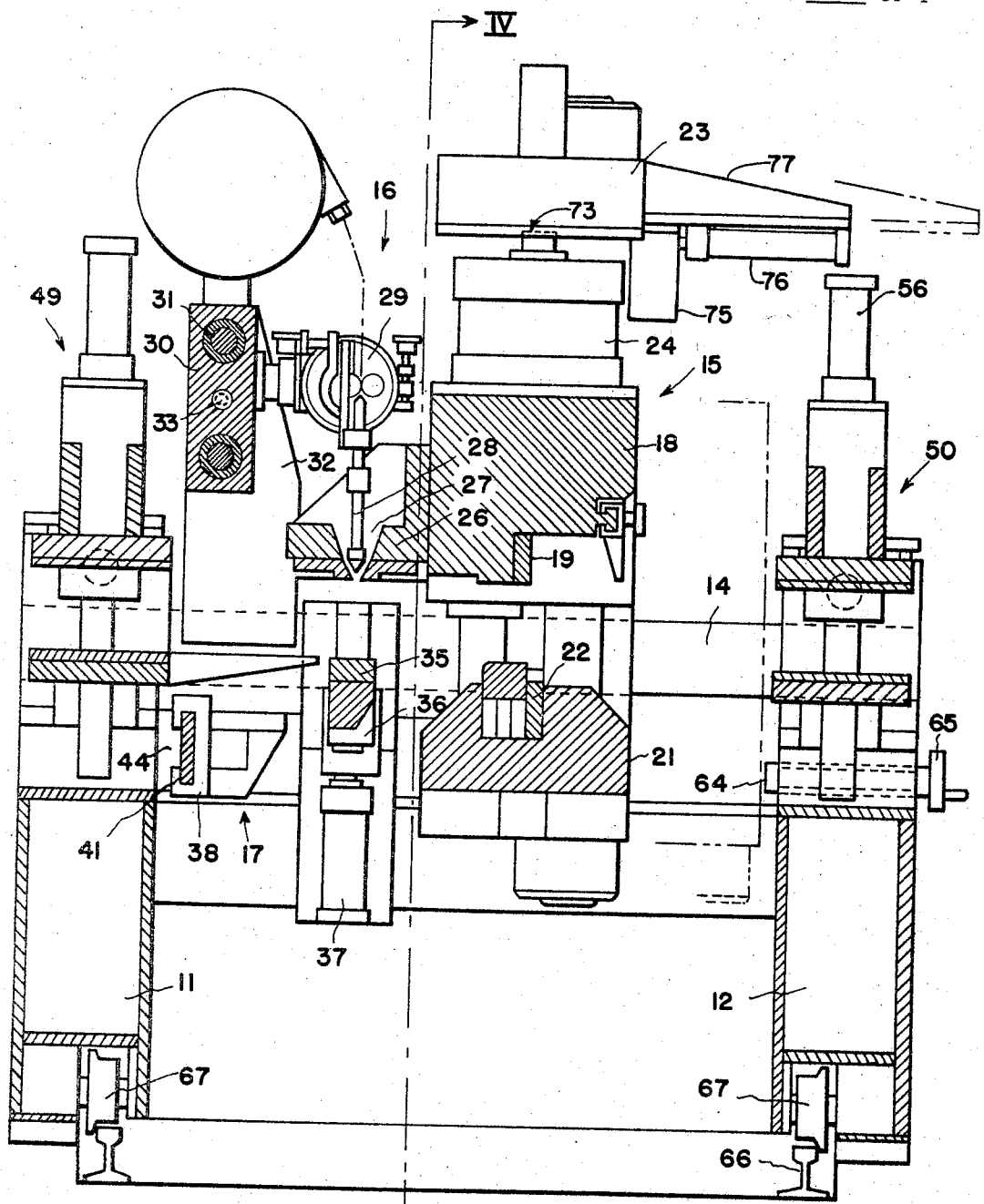
FIG. 1 is a longitudinal sectional view of apparatus constructed according to the principles of the invention, the view being taken generally along the line 1—1 of FIG. 2.
Figure 2:
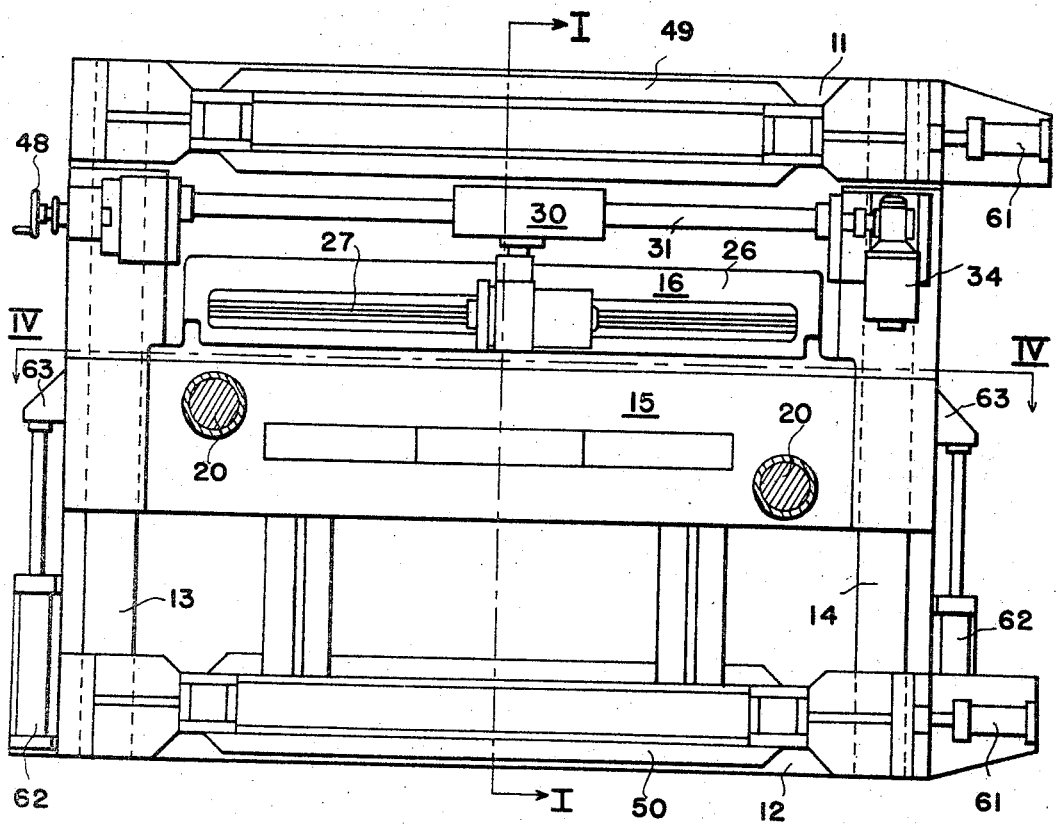
FIG. 2 is a plan view of the apparatus of FIG. 1.
Figure 6:
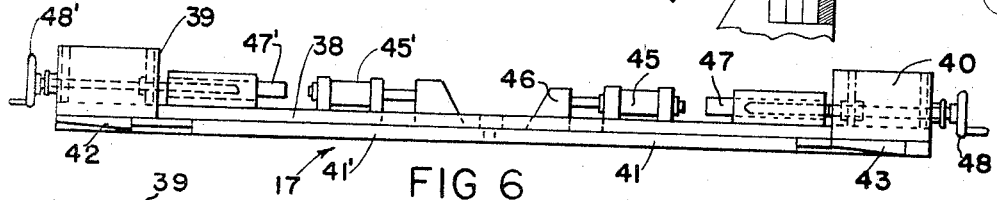
Figure 7:
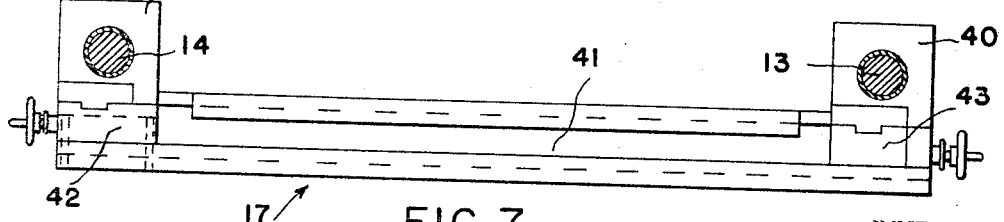

FIGS. 6 and 7 are plan and transverse elevational views, respectively, of a gap setting control used in the assembly of FIGS. 1 and 2; and, FIGS. 8 through 12 illustrate, in succession, the sequence of movement of the various essential parts of the assembly of FIGS. 1 and 2.

Referring first to FIGS. 1 and 2, the frame of the machine disclosed is built up of a pair of longitudinally spaced but transversely extending housings 11 and 12, the words "longitudinal" and "transverse" being used throughout this specification as in reference to the longitudinal path of travel of the strip through the apparatus. These housings 11 and 12 are rigidly staker together by a pair of spaced, longitudinally extending but laterally spaced pair of heavy tie rods 13 and 14 which in practice may be turned and ground shafting.

Slidably mounted for longitudinal movement on the rods 13 and 14 is an assembly of a shear 15, a welder 16 and a gap setting mechanism 17. These devices 15–17 move as a unit, being suitably connected together for this purpose. The shear has a transverse upper beam 18 which carries an upper shear knife 19 and from which is suspended, by means of rods 20, a lower crosshead 21, which carries a lower shear knife 22.

Figure 4:
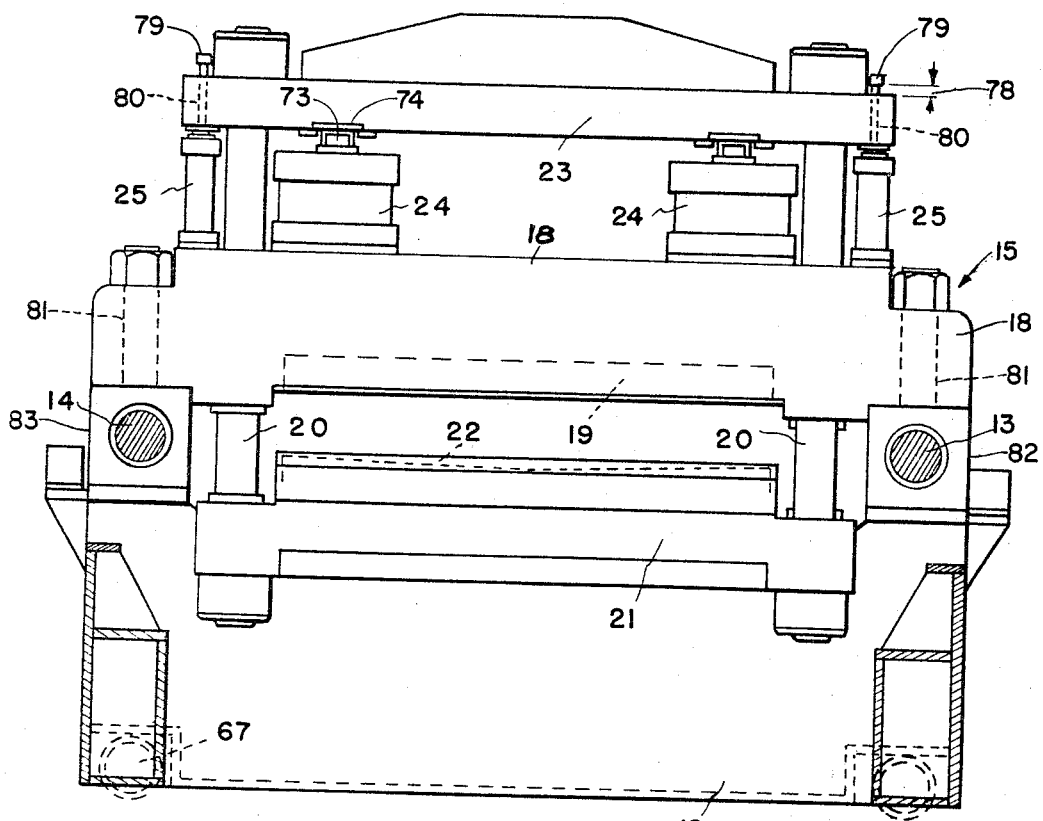
FIG. 4 is a transverse sectional view taken generally along the line IV—IV of FIG. 1 and showing the shear in elevation.

Interconnecting the upper ends of the rods 20 is a heavy crosshead 23 arranged to move upwardly, by means of the large, single acting, short stroke cylinders 24 which are mounted on the beam 18, as shown in FIGS. 1 and 4. Small cylinders 25, also mounted on the beam 18, are used primarily to move the beam 23 and consequently the lower shear blade carrier 21 through the major portion of its non-cutting, upward and downward strokes, thus conserving fluid and power for these non-shearing operations.

To further explain the above, refer to FIG. 4. Lower shear blade carrier 21 is shown in its extreme downward position, being positioned there by the downward pull of cylinders 25. With the material in position for shearing, fluid is admitted to the underside of cylinders 25, which cylinders push beam 23 upwardly, which, in turn, draws lower shear blade carrier upwardly through the medium of the rods 20. The upward motion continues to a point where the lower shear blade is within a small fraction of an inch of starting its shearing action and at which time the cylinders 25 have reached the end of their upward stroke. At this time there will be a definite gap established between the end of piston rod 73 of cylinders 24 and the thrust plate 74 contained in beam 23. Into this gap is pushed the spacer block 75 by means of fluid cylinder 76 supported by bracket 77 which is an integral part of and travels with beam 23.

The heavy shearing force required is now exerted by the large, short stroke, high powered cylinders 24 acting through the medium of spacer blocks 75 onto the beams 23. The short stroke of cylinders 24 keeps the power supply unit to a minimum economical size.

Again referring to FIG. 4, there is a gap 78 between nut 79, on the end of piston rods 80 of cylinders 25, and the beam 23. Being that cylinders 25 are bottomed at the start of actuation of cylinders 24, this gap is to allow the beam 23 to move upwardly free of cylinders 25. However, there is needed the positive pull-down action of cylinders 25 to free the lower shear blade and carrier from the pinching force of the sheared material. This positive downward action is accomplished by reversing the flow of the fluid to cylinders 25 thus causing the gap 78 to close and nuts 79 to engage the top of the beam 23. Further downward movement of cylinders 25, and consequently nuts 79, will draw beam 23 to its maximum downward position.

It will be understood that spacer blocks 75 will be withdrawn to permit the maximum downward movement of beam 23.

The welder 16 comprises an upper clamping platen 26 which is slotted at 27 to receive the tip of a welding torch 28. This torch, as well as its wire feed 29 and connections for electric welding current and inert gas, not particularly shown, are all carried by a block 30 which is slidably mounted and guided for transverse movement on a pair of transverse tie rods 31, the ends of which are staked in suitable brackets 32 fixed with respect to the platen 26. For transversing the welder in the making of a weld, a transverse threaded shaft 33 has screw-threaded connection with the block 30 and is arranged to be driven by a motor-driven speed reducer 34.

It should be understood that rack and pinion or other means could be used instead.

All other forms of fusion welding, as mentioned hereinbefore, could be adapted without changing the scope of the present invention.

Figure 5:
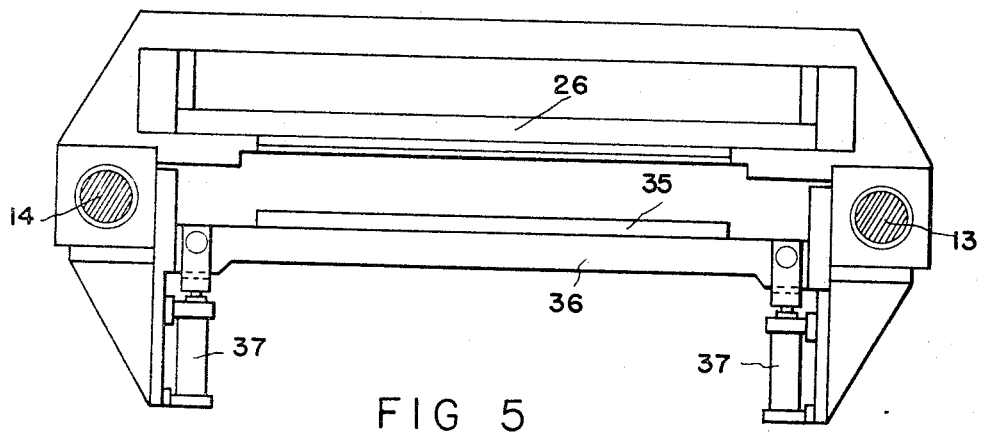
FIG. 5 is a fragmentary transverse sectional view showing the vertically movable weld backup bar in elevation.
Figure 8:
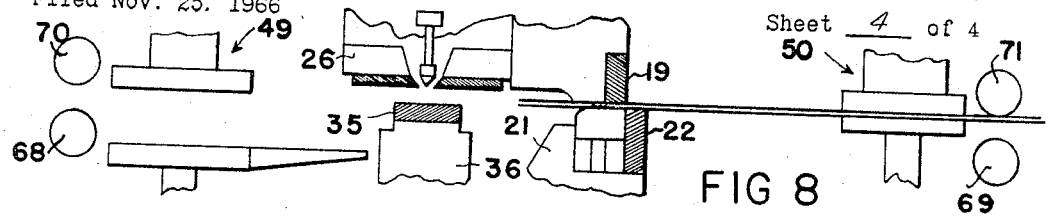

By referring to FIGS. 1 and 5, it will be obvious that the upper clamp platen 26 of the welder does not move vertically but, rather, when the strip lengths to be joined are properly trimmed and spaced and the welder is indexed to position for proper registering with the gap, the adjacent end portions of the strip lengths are clamped up against the platen 26 by a vertically movable clamping bar 35 (see FIGS. 1 and 5). The bar 35 is carried on a vertically movable support 36 operated by a pair of cylinders 37 which are coordinated to have uniform and equal up and down movement by means not shown herein but adequately known in the machine building art.

The gap setting device which moves longitudinally with the shear on the rods 13 and 14 is mounted on a transverse beam 38 which is rigidly connected at its ends to blocks 39 and 40 slidable on the rods 14 and 13, respectively, as shown in FIGS. 6 and 7. This beam 38 has suitable ways for the slidable reception of bars 41 and 41' which carry, at their ends, wedge sections 42 and 43. These wedges 42 and 43 cooperate with similarly inclined surfaces 44 mounted on the housing 11, as indicated in FIG. 1. To actuate the slides 41 and 41', there are provided double-acting cylinders 45 and 45' of which one rod end is connected to the slide through brackets 46 while the other rod end is adapted to engage adjustable stops 47 and 47' arranged to be moved in and out by a screw operated by handwheels 48 and 48'.

Figure 3:
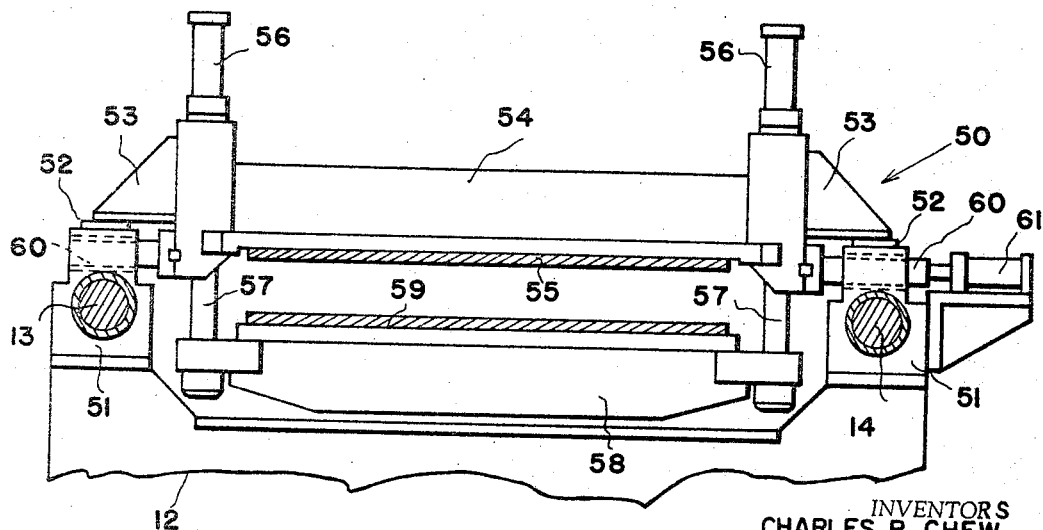
FIG. 3 is a partial end elevation of the apparatus of FIGS. 1 and 2, showing the exit strip clam of the assembly.

Mounted on the housing 11 is an entry strip clamp, designated generally by reference numeral 49, and an exit clamp 50 is mounted on the housing 12. Since these clamps are almost identical and are identically mounted, only the exit clamp shown in FIG. 3 will be described in detail. Rigidly secured to the upper end of the housing 12 is a pair of blocks 51 which receive the ends of the rods 13 and 14. These blocks 51 are vertically extended to provide upper pads 52 on which slide the brackets 53.

These brackets 53 support a crossbeam 54 which mounts a clamping platen 55 on its lower surface. Beam 54 is a composite member to support a pair of upwardly directed cylinders 56, the depending rods 57 of which suspend a lower crossbeam 58 carrying a lower clamp platen 59. To prevent any rocking of the clamp 50 about a transverse axis or sliding movement of the clamp in a longitudinal direction as well as to simplify the transverse shifting of the clamp, two blocks 51 are provided with the line bores in which is slidably received rods 60 which are suitably but rigidly connected to the upper beam structure 54. Connected to a free end of one of the rods 60 is a rod of a double-acting cylinder 61, and it will be obvious that upon actuation of cylinder 61 in either direction, the entire clamp assembly may be shifted bodily in a lateral direction.

To shift the assembly of the shear, welder, and gap setting device longitudinally, as required in the sequence to be hereinafter explained, there is provided at either end of the transverse housing 12 a cylinder 62 which is mounted on the housing and has its rod end connected to the shear 16 by means of a bracket 63.

Completing the physical apparatus required to carry out the principles of the invention, there is provided an adjustable stop 64 which may be simply the butt end of a heavy screw passing through the housing 12 and rotatable by a handwheel 65. To complete the description of the machine illustrated, it should be noted that the entire assembly is movably supported on transverse rails 66 by means of car wheels 67 conveniently housed in the lower portion of the housings 11 and 12. Normally, between welds and with the shear and all the clamps open, strip may run freely through the apparatus on the entry and exit rolls 68 and 69, respectively, (see FIG. 8) with upper rolls 70 and 71 limiting the upward movement of the strip and keeping the same away from the upper platens of the welder and clamps. However, in some mill installations where alternate processing or handling is desired, or for maintenance purposes, it may be desirable to move the joining equipment entirely away from the normal path of strip travel, and hence the rails 66 and wheels 67. It should be noted, however, that the construction of the frame of the machine disclosed is admirably suited for this mobile mounting if the same is desired.

Considering now the operation of the above described apparatus and having a special reference to the sequence illustrated in FIGS. 8 through 12, it should be recognized, first, that in standby normally the shear and all the clamps will be open and strip will be running through the machine, being supported on the rolls 68 and 69. At this time the cylinder 45 (see FIG. 6) will have been actuated to move the bar 41 to the left and the cylinder 62 actuated to press the assembly of the shear, welder, and gap setter against the stops 44 (FIG. 1), whereby the shear will be in a predetermined position with respect to the strip clamps 49 and 50. Now, as the leading strip length is payed off and its trailing end enters the machine, this length will be stopped so that a sufficient tail end portion for cropping will remain ahead of the shear. The exit clamp 50 is now closed firmly by actuation of the cylinders 56 (FIG. 3) and almost immediately thereafter the main shear cylinders are energized to crop off the tail end portion of the leading strip length, the scrap either falling down between the beams 21 and 36 or being withdrawn horizontally through the entry end of the machine, if of considerable length. During this shearing, the weld bar 35 may, if desired, be closed up against the platen 26 to assist in holding the tail end portion of the strip length for the shear if the portion to be cropped is of considerable length.

Figure 9:
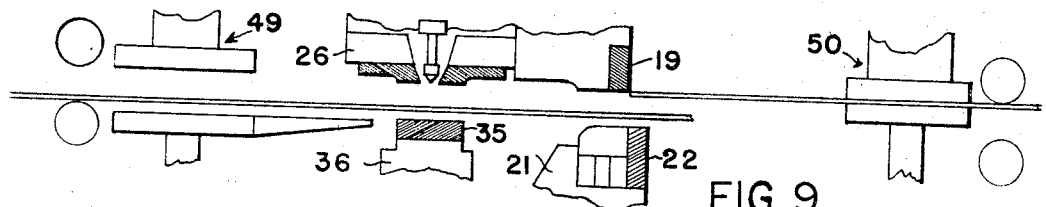
Figure 10:
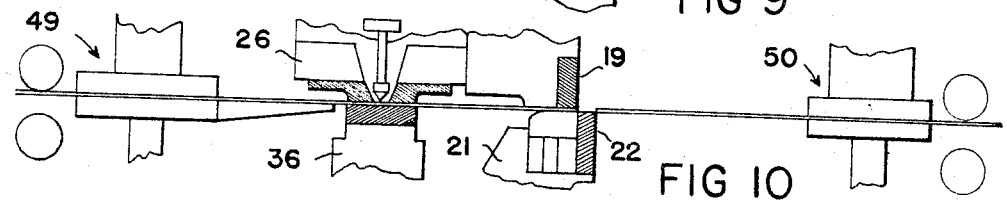
Figure 11:
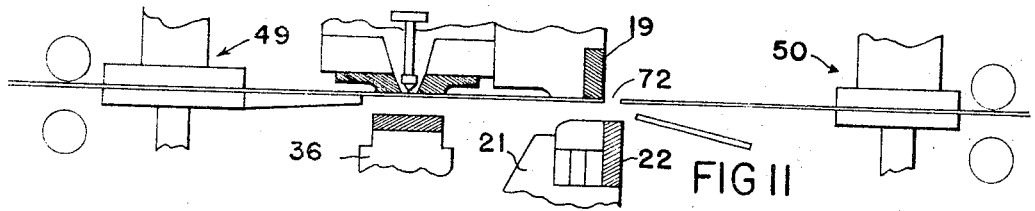
Figure 12:
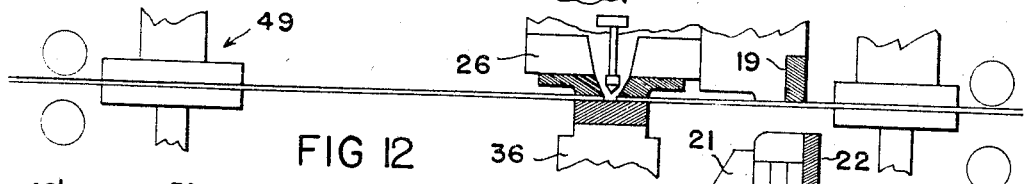

Upon the subsequent opening of the shear and weld clamp, as depicted in FIG. 9, the leading end portion of a new strip length may be fed into the apparatus as illustrated. It moves in below the plane of the trimmed leading strip length so there is no interference between these workpieces. The new strip is entered far enough to reach well past the shear knives 19, 22 but before the next subsequent actuation of the shear, cylinders 45 and 45' are actuated to have their rod ends abut the adjustable stops 47 and 47'. This action sets the wedges 42 and 43 in definite positions to meet complimentary, adjustable blocks mounted on the welder stationary frame when the welder-shear assembly is shifted by means of cylinders 62. The setting of the wedges and the shifting of the welder, shear assembly gives a precisely controlled distance toward the entry end of the machine so that a controlled gap (72 in FIG. 11) will be established between the trimmed tail end of the leading strip and the trimmed head end of the new strip. Of course, prior to this last mentioned actuation of the shear the entry strip clamp 49 and support 36 will have been closed to take out any curvature of the strip, so that the precise gap 72 caused by the shifting of the shear and welder assembly will be maintained.

It should be noted that the flexibility of the tail end portion of the sheared first strip length permits this portion to flex upwardly slightly so as not to interfere with the actuation of the shear on the second strip length. For this purpose, the shear blades 19 and 22 are offset in the direction indicated in FIGS. 1 and 8 through 12. The sheared end portion of the second strip length falls down out of the machine rearwardly of the knife 22.

A further explanation of the gap setting mechanism shown in FIG. 6 is as follows:

In normal operation, the edges of the sheared head end and tail end of the strip are parallel to each other, thus the gap 72 is the same dimension for the full width of the strip. It is sometimes desirable to have the gap tapered about its center line, that is, wider on one end than the other.

This is done by having wedges 42 and 43 independently adjustable by means of handwheels 48 and 48'. Then by energizing either cylinder 45 or 45' in sequence, the amount of movement of each wedge is independent, said amount of movement being determined by the gap between the piston rods of cylinders 45 and 45' and stops 47 and 47'. If one wedge moves more than the other, a skew or taper will be thrown into the welder-shear assembly when said assembly butts against the wedges. By alternating the sequence of actuation of cylinders 45 and 45', there can be sheared the taper on the tail end, head end or both ends of the strip. Journals 81, which are an integral part of bearings 82 and 83, allow the welder-shear assembly to slightly swivel on the journals when contacting the unevenly set wedges to affect the tapered gap. The welder-shear assembly is automatically reset normal to the sheet center line for welding when said welder shear assembly is pulled back against stop 64.

Upon completion of the second shearing and while the workpieces remain tightly gripped in the clamps 49 and 50, the combined shear and welder assembly is indexed to the right as viewed in FIGS. 8–12 against the stop 64, and in this position the vertical center of the welding torch or electrode is precisely at the center of the gap 72. The weld clamp 35 is now raised to clamp the end portions of the workpieces tightly against the toe clamps 26 (or the shoes mounted thereon) and the traversing welding pass of the welding torch 28 may proceed at once.

It is well understood in the strip joining art where a butt weld is effected by a traversing torch or electrode that the quality and uniformity of the weld is largely dependent on the character and precision of the sheared edges to be welded together and their parallel or tapered gap. Both of these desirable characteristics are achieved in a very rapid and dependable manner by the apparatus of the invention, which apparatus is of adequate ruggedness for day-to-day steel mill use and of such nature that its required sequence of operations may be programmed by suitable automatic control, not included herein. The cycle of operation may be rather rapid so as to minimize strip storage capacity in lines where continuous strip must be fed uninterruptedly.

While we have illustrated and described a single specific embodiment of our invention, it will be understood that this is by way of illustration only, and that various changes and modifications may be made within the contemplation of our invention and within the scope of the following claims.

We claim:

1. Apparatus for joining strip in end-to-end relation comprising a base mounting a pair of longitudinally spaced strip clamps which, when opened, permit strip to flow longitudinally through them, an assembly of a transverse shear and an adjacent transversely operable welder slidably mounted for longitudinal movement on said base and between said strip clamps, means to index said assembly into an initial position between said clamps whereby the trailing end of a strip length held in the said one of said pair of clamps may be trimmed, means to index said assembly into a second position slightly spaced from said initial position, whereby said shear may trim the head end of a second strip length secured in the entry, one of said pair of clamps along a line closely spaced from the first line of shear, and means to index said assembly into a third position wherein the centerline of the welder is coincident with the center of the gap thus established between said strip lengths.

2. Apparatus according to claim 1 further characterized in that said shear comprises an upper knife and an offset lower knife movable vertically with respect to said upper knife, and the offset between said knives being such that during the second mentioned index movement, the face of one of said knives moves away from the strip edge previously sheared to permit the tail end portion of the first strip length sheared to flex vertically thereby permitting the second actuation of the shear.

3. Apparatus according to claim 1 further characterized in that said means to index said assembly into initial position comprises means to shift said assembly longitudinally, and an adjustable stop to limit the movement of said assembly in one direction, and further including power means to adjust said stop to permit said indexing movement of said assembly into said second position.

4. Apparatus according to claim 3 further including a second adjustable stop to terminate the movement of said assembly with respect to said clamps when said assembly is moved into said third position.

5. Apparatus according to claim 1 further chararterized in that said base mounts a pair of longitudinally spaced, pedestal-like supports, said strip clamps being mounted on said supports, a pair of traversely spaced but longitudinally extending tie rods rigidly connected at their ends to said supports, and said assembly being slidably mounted on said tie rods.

6. Apparatus according to claim 1 further characterized in that said base includes a pair of longitudinally spaced, pedestal-like supports, each of which mounts one of said clamps, each of said clamps being suspended between a pair of traversely spaced and transversely movable members slidable in the immediate pedestal-like support, and a double-acting cylinder mounted on said support and connected with one of said sliding members whereby the clamp may be moved laterally to adjust the lateral position of a strip length secured therein.

7. Apparatus according to claim 1 further characterized in that said welder includes an upper weld clamp platen and a vertically movable lower weld clamp platen, in that said shear comprises an upper knife and a vertically movable lower knife, and in that said strip clamps each comprises an upper platen and a vertically movable lower platen.

8. Apparatus for joining strip in end-to-end relation comprising a base mounting a pair of longitudinally spaced strip clamps which, when opened, permit strip to flow longitudinally through them, an assembly of a transverse shear and an adjacent transversely operable welder slidably mounted for longitudinal movement on said base and between said strip clamps, said shear comprising an upper stationary blade and blade carrier, and a lower, vertically movable blade suspended by rods through said carrier from a crosshead extending above and parallel to said upper blade, a pair of hydraulic cylinder means mounted on top of said blade carrier and having piston rod means engageable with said crosshead, one of said cylinder means being of smaller diameter and effecting initial raising movement of said lower blade carrier just short of shearing, and the other of said cylinder means being of larger diameter and effecting final and shearing movement of said lower blade carrier.

9. Apparatus according to claim 8 wherein the smaller diameter hydraulic cylinder means has a piston rod means extending vertically upwardly through said crosshead and terminating in an adjustable not constituting a stop element forming a gap with the top of said crosshead, and means for selectively inserting and withdrawing a spacer block between the top end of said larger diameter piston rod means and said crosshead, whereby said crosshead is movable free of said smaller diameter piston rod means during the actual shearing stroke and whereby said nut engages said beam to push it downwardly as a consequence of actuation of said smaller diameter hydraulic cylinder means.

10. Apparatus for joining metal strip in end-to-end relationship, comprising a frame having a shear mounted thereon, a welder mounted thereon for both longitudinal and lateral movement relative to the longitudinal direction of travel of the strip, exit clamp means for clamping the trailing end of a leading strip as it is sheared by said shear, entry clamp means for clamping the leading end of the trailing strip and including adjustable means for selectively spacing the leading edge of the trailing strip in either parallel or angular relationship with the trailing edge of the leading strip, said adjustable means comprising a pair of wedges and a pair of hydraulic cylinders for moving said wedges against a pair of independently adjustable stops.

11. Apparatus for joining metal strip in end-to-end relationship, comprising a frame having a shear mounted thereon, a welder mounted thereon for both longitudinal and lateral movement relative to the longitudinal direction of travel of the strip, exit clamp means for clamping the trailing end of a leading strip as it is sheared by said shear, entry clamp means for clamping the leading end of the trailing strip and including adjustable means for selectively spacing the leading edge of the trailing strip in either parallel or angular relationship with the trailing edge of the leading strip, together with automatic reset means for selectively controlling the path of movement of said welder relative to the gap between the confronting edges of said strips.

References Cited

UNITED STATES PATENTS

| 3,057,056 | 10/1962 | Foley et al. | 29—33.21 |
| 1,936,314 | 11/1933 | Sykes | 29—33.21 |
| 2,078,365 | 4/1937 | Biggert et al. | 29—33.21 |

RICHARD H. GANES, JR., *Primary Examiner.*